Aug. 1, 1950        F. R. AMBROSE        2,517,372
FILLER CAP FOR FUEL TANKS AND THE LIKE
Filed May 20, 1949        2 Sheets-Sheet 1
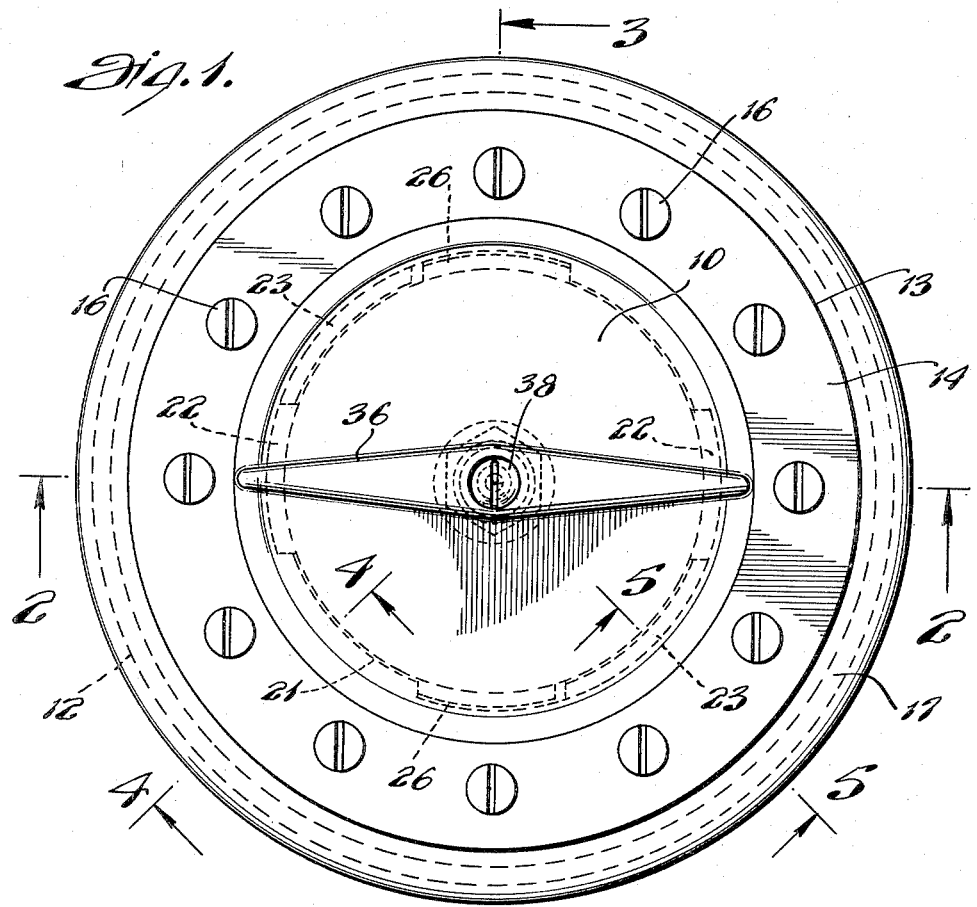
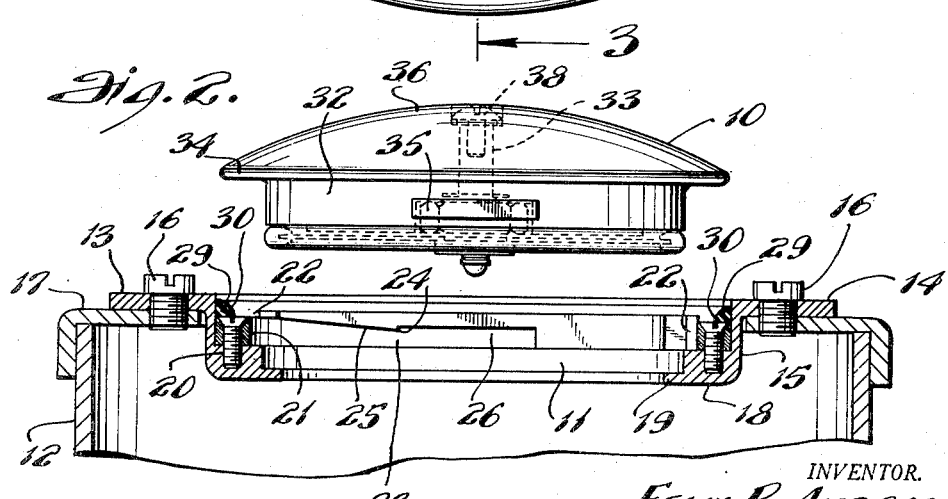
INVENTOR.
FELIX R. AMBROSE
BY
*Clark & Ott*
ATTORNEYS Aug. 1, 1950  F. R. AMBROSE  2,517,372
FILLER CAP FOR FUEL TANKS AND THE LIKE
Filed May 20, 1949  2 Sheets-Sheet 2

INVENTOR.
FELIX R. AMBROSE
BY
Clark & Alt
ATTORNEYS

Patented Aug. 1, 1950

2,517,372

UNITED STATES PATENT OFFICE 2,517,372

FILLER CAP FOR FUEL TANKS AND THE LIKE

Felix R. Ambrose, West Englewood, N. J., assignor to Air Associates, Incorporated, Teterboro, N. J., a corporation of New Jersey Application May 20, 1949, Serial No. 94,305

5 Claims. (Cl. 220—40)

This invention relates to a filler cap for fuel tanks and the like.

An object of the invention is to provide a filler cap which constitutes an effective liquid-tight closure and which can be conveniently and quickly secured in closed position and readily removed for uncovering the filling opening.

Another object of the invention is to provide a filler cap having bayonet type connection for securing the same in the filling opening and which includes a dish shaped spring expandable radially by inward closing movement of the cap for sealing the opening and for tensioning the cap in closed relation.

Another object of the invention is to provide a filler cap of the indicated character in which a flexible resilient ring is fitted over the periphery of the dish shaped spring and which is compressed against the wall of the opening by the closing movement of the cap for sealing the same.

Still another object of the invention is the provision of a tank having a filling opening provided with a replaceable metallic ring formed with bayonet type slots adapted to be engaged by arcuate rim portions of the cap for securing the cap in closed relation in the filling opening and for tightening the same against annular resilient rings for sealing the closure.

Still another object of the invention is the provision of a filler cap which is so constructed and arranged that the same is moved inwardly a few hundredths of an inch to effectively close and seal the opening.

With the foregoing and other objects in view, reference is now made to the following specification and accompanying drawings in which the preferred embodiment of the invention is illustrated.

In the drawings:

Fig. 1 is a top plan view of a filler cap for fuel tanks and the like constructed in accordance with the invention and showing the same in closed position on a tank.

Fig. 2 is a vertical sectional view taken approximately on line 2—2 of Fig. 1 with the tank partly broken away and the filler cap shown in side elevation and in separated juxtaposition.

Figure 3:
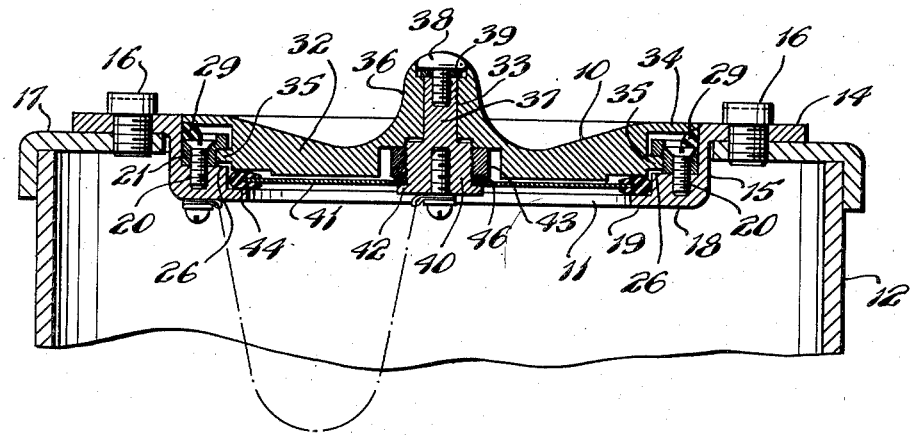
Fig. 3 is a vertical sectional view taken approximately on line 3—3 of Fig. 1.
Figure 4:
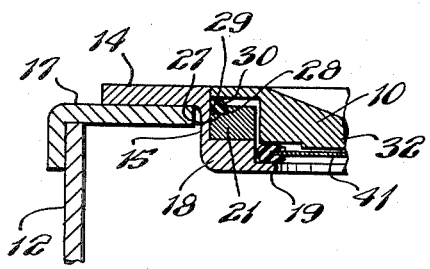
Fig. 4 is a fragmentary vertical sectional view taken approximately on line 4—4 of Fig. 1.
Figure 5:
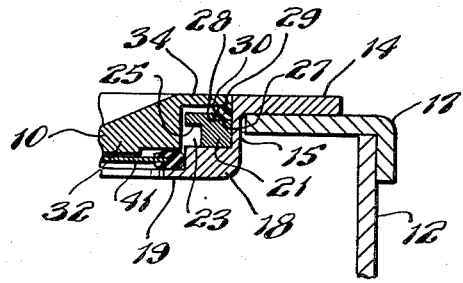
Fig. 5 is a similar view taken approximately on line 5—5 of Fig. 1.
Figure 6:
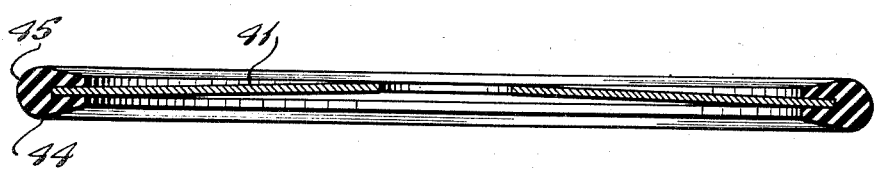
Fig. 6 is a vertical sectional view of the dish shaped spring.

Referring to the drawings by characters of reference, the filler cap indicated generally by the reference character 10 is adapted to be arranged in closing relation in the filling opening 11 in a fuel tank 12 or the like. The filling opening 11 is formed in an annular frame 13 having an upper flange 14 extending peripherally about the annular wall 15 thereof and secured by circumferentially spaced screws 16 to the top wall 17 of the tank. The frame 13 is also formed with a peripheral flange 18 extending inwardly from the lower end of the annular wall 15, and the flange having an inwardly extending annular lip 19 about its inner periphery with the inner edge of the flange and lip defining the filling opening.

Secured upon the upper face of the flange 18 by circumferentially spaced screws 20 is a metallic ring member 21 having diametrically opposed vertically arranged slots 22 in the inner periphery thereof which open through the upper and lower faces of said ring member. The said slots communicate with rectangular shaped recesses 23 formed in the inner and lower faces of said ring member and which extend about the ring member approximately through an arc of 90 degrees in clockwise direction. The upper faces of the recesses 23 extend downwardly in angular relation from the slots 22 to the shoulders 24 forming cam faces 25, with the shoulders 24 forming notches and providing rectangular recesses 26 disposed above the lower ends of the cam faces 25 respectively.

The ring member 21 is recessed in the upper face thereof adjacent the outer annular edge as at 27 with an undercut 28 in which is fitted a gasket 29 of flexible resilient material which projects upwardly beyond the upper face of the ring member with the outer annular face thereof disposed against the inner face of the annular wall 15 and with the arcuate upper face 30 extending into the undercut 28.

The cap 10 consists of an annular body 32 having an axial opening 33 and the same is formed with a peripheral flange 34 extending laterally outward from the top thereof and adapted to overlie the ring member 21 with the outer peripheral portion of the flange adapted to seat on the gasket 29 when the cap is arranged in the filling opening 11. The body 32 is also formed with arcuate projections 35 extending outwardly from the periphery thereof in diametrically opposed relation and which are of a length to pass downwardly in the slots 22 and to engage against the cam faces 25 when the filler cap is rotated in the filling opening and to be received in the recesses 26 to latch the filler cap in position in the filling opening. The axial opening 33 extends medially through the laterally extending upwardly projecting rib 36 which forms a handle member for gripping the filler cap for turning the same in the filling opening. A stud 37 is arranged in said axial opening 33 for relative turning movement of the cap with relation thereto and the same is secured therein by means of a screw 38 threadedly engaged in the upper end thereof with a lock washer 39 disposed between the head of the screw and the upper end of the stud and with the enlarged lower end 40 of the stud protruding through the enlarged lower end of the axial opening.

In order to tension the filler cap in the filling opening 11, and to prevent the arcuate projections 35 from being accidentally or unintentionally disengaged from the recesses 26, a dish or frusto-conical shaped metallic spring 41 is secured on the stud 37 between the flange 42 thereof and a nut 43 threadedly engaged on the enlarged lower end 40 thereof. The said spring underlies the annular body 32 and is provided with an annular sealing ring 44 of flexible resilient material secured over the outer periphery thereof and which is adapted to seat on the annular lip 19 and to be impinged thereagainst and against the inner periphery of the flange 18 when the filler cap is tightened in the filling opening by rotating the same to cam the arcuate projections 35 against the cam faces 25 and to dispose the arcuate projections in tightened relation in the recesses 26.

The sealing ring 44 is formed with an arcuately shaped outer periphery 45 in cross-sectional configuration so that the same will engage against the inner periphery of the flange 18 and the upper face of the annular lip 19 when the filler cap is tightened in the filling opening. The spring 41 will be deformed from the frusto-conical cross-sectional configuration to a substantially flattened formation when the filler cap is tightened in the filling opening and the downward flexing of the said spring to substantially flattened formation effects lateral outward movement of the periphery thereof together with the annular sealing ring 44 to impinge the same tightly against the inner periphery of the flange 18 and downwardly against the annular lip 19. The tightening movement of the filler cap in the filling opening also tightens the flange 18 against the gasket 29 to form a leak-proof connection. The nut 43 is recessed in its lower face in which is arranged a resilient sealing ring 46 which engages against the upper face of the spring 41 to form a leak-proof connection between the nut and the spring.

What is claimed is:

1. In a device of the character described, a frame affixed to a tank and having an inwardly directed annular flange defining a filling opening, an annular ring secured upon said flange, said ring having spaced upwardly extending slots in its inner periphery arranged in communication respectively with recesses extending arcuately about its inner periphery and having cam faces on the upper walls of said recesses, an annular gasket secured to the upper face of said ring, a filler cap having an annular flange adapted to seat on said gasket and having outwardly extending spaced arcuate projections adapted to pass downwardly in said slots and engage against said cam faces respectively when the cap is turned in the filling opening, and a sheet metal spring of frusto-conical shape having its apical end affixed to a central portion of the lower face of said cap and adapted to be tensioned downwardly about the annular flange of said frame when the said projections of the cap are impinged against said cam faces.

2. In a device of the character described, a frame affixed to a tank and having an inwardly directed annular flange defining a filling opening, an annular ring secured upon said flange, said ring having spaced upwardly extending slots in its inner periphery arranged in communication respectively with recesses extending arcuately about its inner periphery and having cam faces on the upper walls of said recesses, an annular gasket secured to the upper face of said ring, a filler cap having an annular flange adapted to seat on said gasket and having outwardly extending spaced arcuate projections adapted to pass downwardly in said slots and engage against said cam faces respectively when the cap is turned in the filling opening, a sheet metal spring of frusto-conical shape having its apical end affixed to a central portion of the lower face of said cap, and a flexible resilient sealing ring secured over the outer periphery of said spring and adapted to seat on the annular flange of said frame and to be tensioned thereagainst when the said projections of the cap are impinged against said cam faces to thereby tighten the annular flange of the cap against said annular gasket.

3. In a device of the character described, a frame affixed to a tank and having an inwardly directed annular flange defining a filling opening, an annular ring secured upon said flange, said ring having spaced upwardly directed slots in its inner periphery arranged in communication respectively with recesses extending annularly about its inner periphery and having cam faces on the upper walls of said recesses, an annular gasket secured to the upper face of said ring, a filler cap having an annular flange adapted to seat on said gasket and having outwardly extending spaced arcuate projections adapted to pass downwardly in said slots and engage against said cam faces respectively when the cap is turned in the filling opening, a sheet metal spring of frusto-conical shape having its apical end affixed to a central portion of the lower face of said cap, a flexible resilient sealing ring secured over the outer periphery of said spring, and said spring being adapted to expand radially outward when compressed downwardly to substantially flattened condition by the camming of the cap downwardly against said cam faces to thereby impinge said sealing ring laterally and downwardly against the annular flange of said frame.

4. In a device of the character described, a frame affixed to a tank and having an inwardly directed annular flange defining a filling opening, an annular ring secured upon said flange, said ring having spaced upwardly directed slots in its inner periphery arranged in communication respectively with recesses extending annularly about its inner periphery and having cam faces on the upper walls of said recesses, an annular gasket secured to the upper face of said ring, a filler cap having an annular flange adapted to seat on said gasket and having outwardly extending spaced arcuate projections adapted to pass downwardly in said slots and engage against said cam faces respectively when the cap is turned in the filling opening, a sheet metal spring of frusto-conical shape having its apical end affixed to a central portion of the lower face of said cap, a flexible resilient sealing ring secured over the outer periphery of said spring, said spring being adapted to expand radially outward when compressed downwardly to substantially flattened condition by the camming of the cap downwardly against said cam faces to thereby impinge said sealing ring laterally and downwardly against the annular flange of said frame, and said ring having upwardly recessed notches at the ends of said cam faces in which said projections are disposed to latch the filler cap in position in the filling opening.

5. In a device of the character described, a tank having an inwardly directed annular flange defining a filling opening, an annular ring secured upon said flange and having cam faces bordering the inner periphery thereof, a filler cap having projections adapted to engage said cam faces, and a sheet metal spring of frusto-conical shape having its apical end affixed to a central portion of the lower face of said cap and adapted to be tensioned downwardly about the annular flange of said frame when the said projections of the cap are impinged against said cam faces.

FELIX R. AMBROSE.

REFERENCES CITED

The following references are of record in the file of this patent:

UNITED STATES PATENTS

| Number | Name | Date |
| --- | --- | --- |
| 1,569,881 | Reid | Jan. 19, 1926 |
| 1,738,893 | Grady | Dec. 10, 1929 |
| 1,756,976 | Ehlers | May 6, 1930 |
| 1,819,804 | Whiting | Aug. 18, 1931 |
| 2,164,450 | Eshbaugh et al. | July 4, 1939 |